United States Patent [19]

Noel et al.

[11] Patent Number: 5,205,184

[45] Date of Patent: Apr. 27, 1993

[54] PARKING HAND BRAKE FOR A MOTOR VEHICLE AND MANUFACTURING PROCESS OF BRAKE LEVER

[75] Inventors: Jean-Pierre Noel; Philippe Clerc, both of St. Die, France

[73] Assignee: Rockwell Automotive Body Systems, France

[21] Appl. No.: 832,821

[22] Filed: Feb. 7, 1992

[30] Foreign Application Priority Data

Feb. 11, 1991 [FR] France .................... 91 01549

[51] Int. Cl.[5] ............................................. G05G 5/18
[52] U.S. Cl. .................................... 74/538; 74/535
[58] Field of Search ................... 74/535, 536, 538

[56] References Cited

U.S. PATENT DOCUMENTS

| | | | |
|---|---|---|---|
| 3,216,276 | 11/1965 | Nagy | 74/538 |
| 3,620,099 | 11/1971 | Stotz | 74/538 |
| 4,212,211 | 7/1980 | Rickert | 74/538 |
| 4,403,524 | 9/1983 | Gurney | 74/538 |
| 4,876,914 | 10/1989 | Kanno | 74/538 |
| 5,001,942 | 3/1991 | Boyer | 74/535 |
| 5,067,366 | 11/1991 | Gandiglio | 74/535 |

FOREIGN PATENT DOCUMENTS

| | | | |
|---|---|---|---|
| 403546 | 9/1969 | Australia | 74/538 |
| 61-218460 | 9/1986 | Japan | 74/538 |
| 2-274645 | 11/1990 | Japan | 74/535 |

Primary Examiner—Rodney H. Bonck
Assistant Examiner—Ryan W. Massey

[57] ABSTRACT

Brake designed to be connected to a brake cable (15), comprising a ratchet plate (1, 2) fixed to the floor of the vehicle, a pawl (4) designed so as to interact with the ratchet plate (2), and a handgrip lever (6) equipped with a push-button (18) associated with the pawl; it comprises a cassette casing (5) mechanically integral with the lever, containing the ratchet plate (1, 2) and the pawl (4), articulated on the ratchet plate and on the end of the brake cable (15). The cassette (5) is formed from two end plates (5a) between which are arranged the ratchet plate (1) and the pawl (4), and which are fixed to the lever (6) Because the lever is split into a grip lever (6) and a cassette casing (5), it is possible to make only the latter from sheet metal so as to enable it to withstand forces, whilst the lever (6) can be made from plastic molded into various shapes depending upon the desired aesthetics. This arrangement reduces the weight and the cost price of the brake, and permits automatic assembly of its constituent parts, with the exception of the plastic lever (6).

2 Claims, 3 Drawing Sheets

PARKING HAND BRAKE FOR A MOTOR VEHICLE AND MANUFACTURING PROCESS OF BRAKE LEVER

BACKGROUND OF THE INVENTION

1. Field of the Invention

The subject of the present invention is a hand brake for a motor vehicle, designed so as to be connected to a brake cable.

2. Description of the Related Art

Parking hand brakes are known which comprise a ratchet plate intended to be fixed to the floor of the vehicle, a pawl designed so as to interact with the ratchet plate, and a handgrip lever equipped with a push-button associated with the pawl.

In one particular embodiment, the grip lever is made from sheet metal and is bent into a U-shape, in which the two end plates resulting from this bending are used as elements for combining the other parts. The pawl is linked to a release push-button, making it possible to hold the brake locked in the desired position, and correlatively to unlock it. The ratchet plate interacting with the pawl is associated with a device for fixing the brake on the floor of the vehicle, and with a joint which gives the lever its rotational movement with respect to the ratchet plate in order to pull on the brake cable. The end plates of the U-shaped lever extend in the desired direction, substantially perpendicular to the action of the cable or cables.

This mechanical device must usually be supplemented, for aesthetical reasons, with a grip handle which is often extended by a plastic decorative piece.

The manufacturing cost of these known brakes is relatively high. Furthermore, assembly lines must be provided which are specific to each type of brake, making it impossible to automate their assembly. Indeed, the levers can have a different form depending upon the wishes of the customer, this diversity of form being poorly compatible with automatic assembly of the various constituent parts of the brake. Such automation is also not facilitated by the U-shaped configuration of the lever.

Lastly, the grip levers of the known brakes contain a rigid push rod, and are hence correlatively rectilinear or slightly angled, which limits the diversity of forms which the handgrip handle of the lever can encompass.

The object of the invention is to provide a parking hand brake whose structure is simplified as compared with that of the known brakes, and which permits partial automation of its assembly, thus reducing the cost price of the brake.

SUMMARY OF THE INVENTION

According to the invention, the hand brake for a motor vehicle comprises a cassette casing mechanically integral with the grip lever, containing the ratchet plate and the pawl, this cassette casing being articulated about a transverse pivot pin traversing the ratchet plate, and being adapted so as to receive the end of the cable.

The cassette casing (termed hereafter "cassette") can thus be standard and hence always has the same form, whilst the associated grip lever can have various shapes adapted to the wishes of the customer in respect of aesthetics. This permits automation of the assembly of the parts of the brake, with the exception of the grip lever. Furthermore, this structure makes it possible to manufacture only the cassette from sheet metal, the grip lever being made from moulded plastic, thus reducing the cost price and the weight of the assembly.

The metal cassette is subjected to all the forces exerted on the brake, the plastic lever only being subjected to the temporary forces of applying the brake when the latter is operated by hand.

According to other features of the invention:

The cassette is formed from two end plates rigidly interconnected by the abovementioned transverse pivot pin, between which are arranged the ratchet plate and the pawl, and which are provided with means for fastening to the lever.

The cassette is housed in an end part of the lever, integrally connected to the cassette, which is provided with internal ribs over which hook complementary retaining flanks of the cassette, the said means for fastening the cassette to the lever also comprising, for example, at least one rivet or at least one screw.

The grip lever contains a semi-rigid push rod capable of sliding inside the lever and the end of which can push the pawl in order to release it from the ratchet plate and enable the lever and the cassette to pivot about their common axis of rotation.

Because the push rod is semi-rigid and not rigid as in the known prior embodiment, it is possible to manufacture levers which are angled more sharply than the prior levers, and which hence have a greater diversity depending upon the wishes of the customer.

Other features and advantages of the invention will become apparent during the following description, made with reference to the attached drawings which illustrate two embodiments of the invention by way of non-limiting examples.

DESCRIPTION OF THE PREFERRED EMBODIMENT

Figure 1:
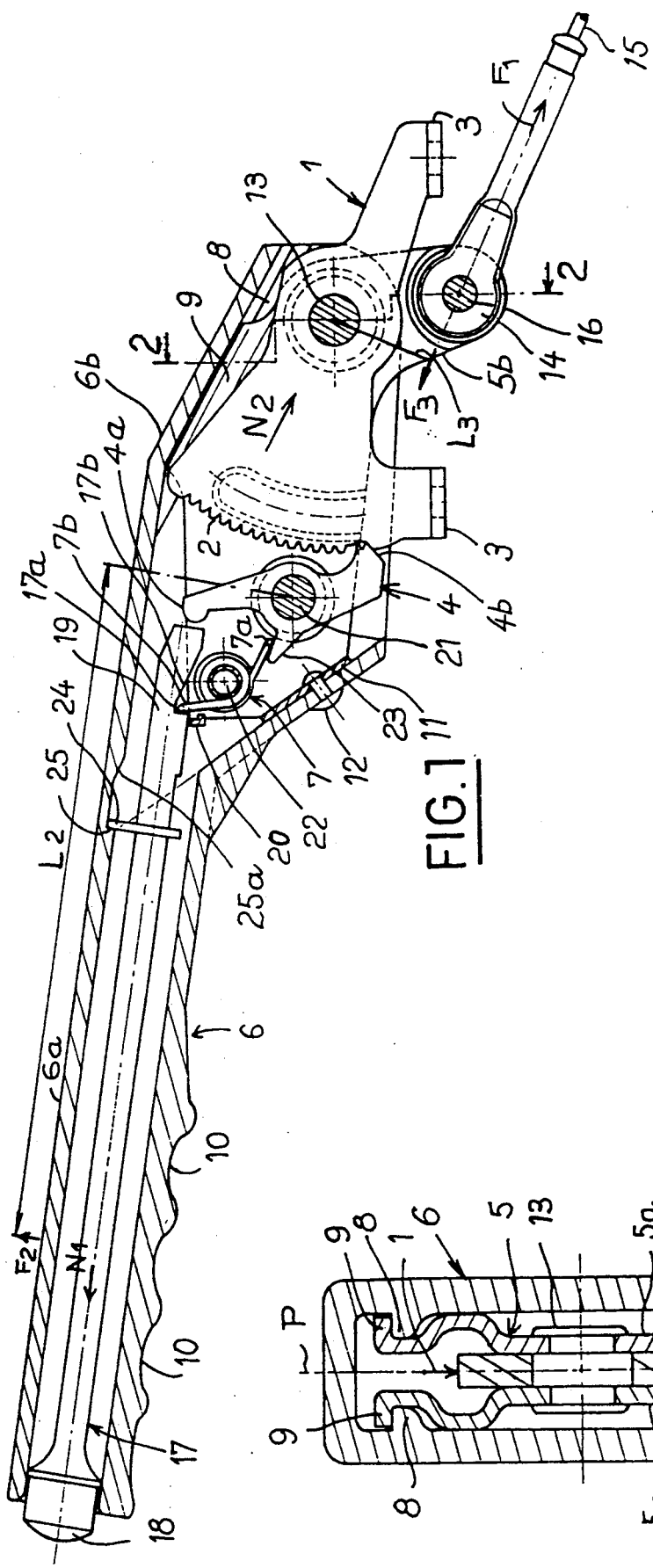
FIG. 1 is a view in longitudinal section and partial elevation of a first embodiment of the parking hand brake for a motor vehicle according to the invention, in the released rest position.
Figure 2:
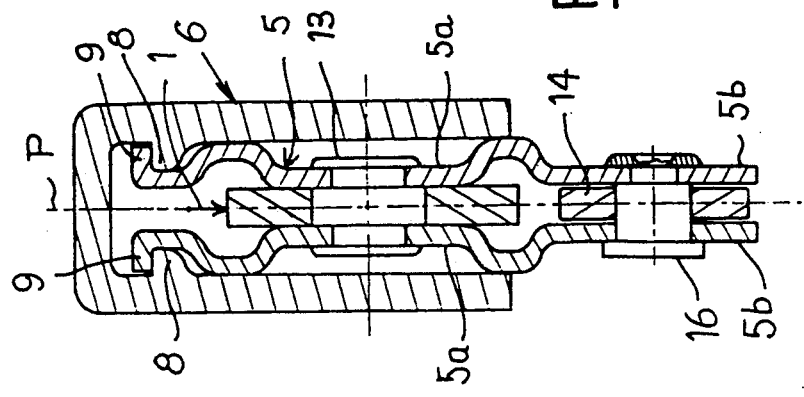
FIG. 2 is a view in cross-section along 2—2 in FIG. 1.

The hand brake for a motor vehicle shown in FIGS. 1 to 4 comprises a ratchet plate 1 provided with teeth 2 and with lugs 3 for fixing to the floor (not shown) of the vehicle by any appropriate means such as screws.

The brake also comprises a cassette 5 mechanically integral with a hollow lever 6 comprising a hand-grip zone 6a and a widened zone 6b for fastening to the cassette 5. In this fastening zone 6b, there are contained the cassette 5 and the ratchet plate 1, the pawl 4 and a return spring 7, the arrangement and role of which will be explained below.

In the embodiment shown, the cassette 5 consists of two end plates 5a which are symmetrical with respect to an axial plane P, between which are placed the ratchet plate 1, the pawl 4 and the spring 7. The cassette 5 housed inside the end zone 6b of the lever 6 is made mechanically integral with the latter, for example by means of ribs 8 projecting internally from the facing walls of the end zone 6b, opposite each other, and over which fit complementary retaining flanks 9 of the end plates 5a. The fastening of the cassette 5 to the lever 6 is completed, for example, by means of an internal lug 11 of the cassette 5, applied to one wall of the widened zone 6b, and by means of an element such as a rivet 12 or a screw traversing the lug 11 and the wall of the zone 6b. The cassette 5 is articulated about a transverse pivot pin 13 traversing the ratchet plate 1, it being possible for this pivot pin 13 to consist, as shown, of a rivet. At their end opposite the flanks 9, the end plates 5a terminate in two arms 5b connected by an assembly rivet 16 forming a pivot pin for a part 14 to which is fastened the end of the cable 15, connected to brake elements (not shown). The arms 5b are substantially perpendicular to the direction of pulling F1 on the cable 15.

The lever 6 can advantageously be made from plastic moulded into appropriate shapes, with depressions 10 for satisfactory gripping and corresponding to the desired aesthetics, whilst the cassette 5 is metal, for example made from sheet metal.

The hollow zones 6a, 6b of the lever 6 are obtained by means of two movable cores of the mould (not shown), having opposite and non-parallel axes of displacement N1 and N2. Because of this non-parallelism, the grip lever 6 is angled in its zone 6b for fastening to the cassette 5, and rectilinear in its gripping zone 6a.

The tubular gripping zone 6a contains a semi-rigid push rod 17 terminating on the side opposite the cassette 5 in a push-button 18 projecting partially from the end of the lever 6 in the normal rest position of the push rod 17. The latter has, on the side opposite the push button 18, a head 19, the end of which is placed opposite the end part of one arm 4a of the pawl 4, which is articulated about a transverse spindle 21 fixed to the end plates 5a. The pawl 4 has a second arm 4b, opposite the arm 4a and provided with a scooped-out nose capable of meshing with the teeth 2. The latter extend over an appropriate angular sector, for example of the order of approximately 60°, and which corresponds to the deflection angle of the lever 6 and the cassette 5.

The spring 7 is wound around a transverse pivot pin 22 connecting the end plates 5a and fixed to them. A first end 7a of the spring 7 interacts with a finger 23 of the pawl 4, placed between the two arms 4a and 4b, in such a way that the force thus exerted on the pawl 4 tends to return it constantly into its position meshing with the teeth 2. The second end 7b of the spring 7 is engaged in a notch 17a in the head 19 of the push rod 17 so as to return the latter into its initial position, shown in FIG. 1, in which the push-button 18 projects partially outside the lever 6. On the pawl 4 side, the notch 17a is delimited by an inclined ramp 17b on which can slide the end 7b and which facilitates its insertion into the notch 17a.

The push rod 17 is provided with an element 24 projecting transversely and being applied to a catch stop 25 for the rod 17 pushed by the spring 7. The stop 25 consists, in the embodiment shown, of the transverse wall of a notch made in the inner wall of the gripping zone 6a of the lever 6 and comprising an access ramp 25a for the element 24.

The rivets 13 and 16 rigidly assemble the end plates 5a, it being possible for the shapes of the end arms 5b to be appropriate for all known types of cable control.

Figure 3:
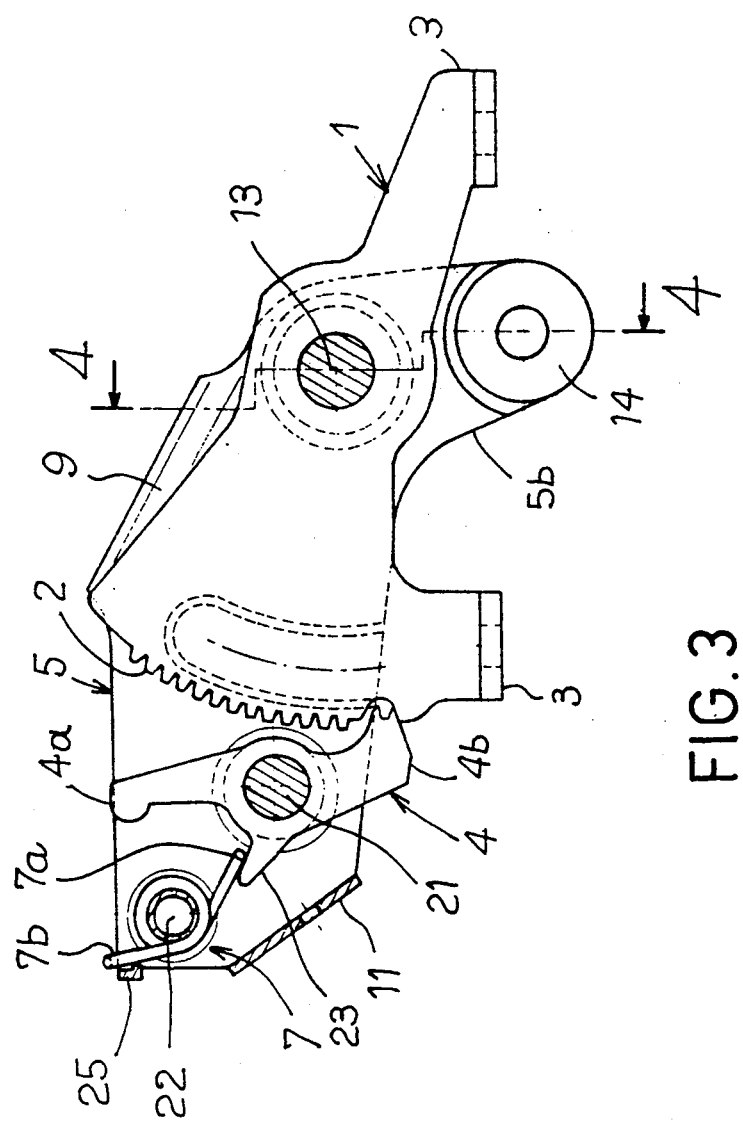
FIG. 3 is a view in longitudinal elevation and partial section of the cassette and of the ratchet plate of the brake in FIGS. 1 and 2.
Figure 4:
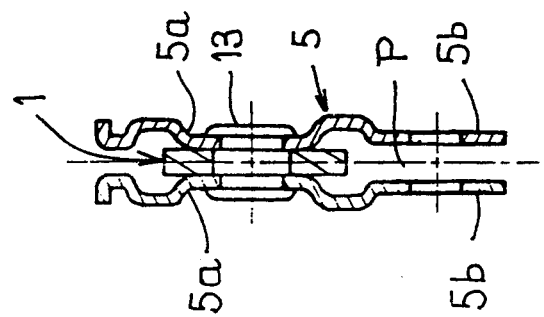
FIG. 4 is a view in cross-section along 4—4 in FIG. 3.

One of the end plates 5a is provided, at its end adjacent to the head 19 of the push rod 17, with a transverse lug 20 serving as a support for the end 7b of the spring 7, before the cassette 5 and the lever 6 are assembled (FIG. 3). When the assembly formed by the ratchet plate 1, the cassette 5, the pawl 4 and the spring 7 is introduced into the hollow zone 6a of the lever 6, the end of the arm 7b slides on the inclined ramp 17b of the notch 17a, and then abuts the transverse wall of this notch 17a, which thus moves the arm 7b away from the lug 20.

The hand brake which has just been described functions as follows.

In the rest position (FIG. 1), the lever 6 and the cassette 5 are held in a low position under the action of the force F1 generated by the return springs (not shown) of the cable 15. In this rest position, the nose of the arm 4b of the pawl 4 does not mesh with the teeth 2. When the user wishes to actuate the brake, he/she takes hold of the gripping zone 6a, placing his/her fingers in the depressions 10, and lifts the lever 6 in the direction F2, in order thus to pivot it and the cassette 5 about their common pivot pin 13. The pivoting of the lever 6 is transmitted to the cassette 5 by the retaining flanks 9 and by the fastening lug 11. As a result, a tensile force is exerted on the cable 15 which is proportional to the force F2 exerted by the user on the lever 6, and this takes place within the ratio of the respective lever arms L2 and L3 of the forces F2 and F3.

During the lifting of the lever 6 by the user, the rotation of the lever 6 and the cassette 5 about their common pivot pin 13 displaces the pawl 4 with respect to the ratchet plate 1. As a result, the nose 4b of the pawl 4 clicks over the teeth 2 of the ratchet plate 1 as far as a position where the user ceases to act on the lever 6, and this takes place by virtue of the action of the arm 7a of the spring 7 on the finger 23 of the pawl 4.

In order to unlock the brake, the user lifts the lever 6 slightly so as to facilitate the movement of the pawl 4, and he/she presses on the push-button 18, counter to the return forces of the spring 7, so as to release the nose 4b from the teeth 2. He/she can then accompany the lever 6 into its rest position counter to the tensile forces of the cable 15.

During the operation, the lever 6, advantageously made from moulded plastic, is subjected to the stresses and forces caused by the tension of the cable 15. On the other hand, as soon as the brake has reached its applied position (or conversely its released position), the forces produced by the tension of the cable 15 are absorbed solely by the cassette 5, and hence only by metal elements. The separation of the operating lever into two mechanically integral constituent elements, namely the lever 6 and the cassette 5, it being possible for the first element advantageously to be made from plastic and the second element being metal and having a standard shape irrespective of the configuration of the grip lever 6, thus makes it possible to subject the latter only to the temporary forces of applying the brake when the latter is operated by hand. These forces can be sustained by a lever made from plastic, which considerably reduces the weight and the cost price of the brake as a whole.

Indeed, a not inconsiderable saving in weight of the brake is achieved by virtue of the fact that the dimensions of the cassette 5 are just sufficient to absorb the forces, and require only a very small amount of sheet metal.

The cassette 5 can be assembled easily and automatically with the other parts, with the exception of the moulded lever 6.

Lastly, because the return spring 7 interacts simultaneously, but independently, with the pawl 4 in order to return it into contact with the ratchet plate 1, and with the push rod 17, operating noises during the application of the brake are reduced.

Figure 5:
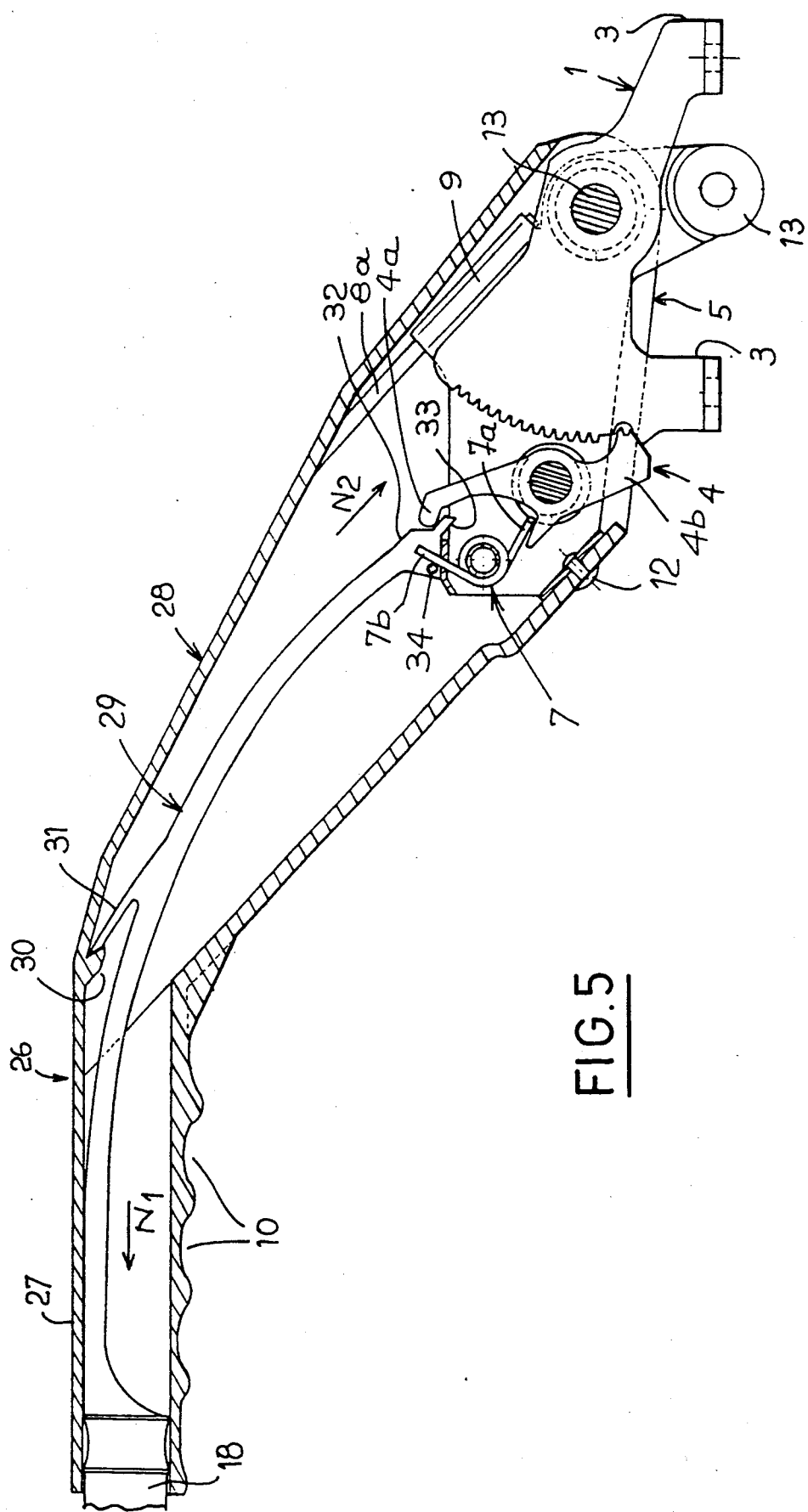
FIG. 5 is a view in longitudinal section and partial elevation of a second embodiment of the hand brake according to the invention, in the released rest position.

In the second embodiment illustrated in FIG. 5, the hand brake according to the invention differs from the former embodiment in that its lever 26 is sharply angled. It consists of a first rectilinear handgrip zone 27, and of a second zone 28 for fastening to the cassette 5, which is longer than the corresponding fastening zone 6a in FIG. 1. The push rod 29 is curved in order to adapt to the angle of the lever 26. It is equipped with a tongue 31 projecting laterally towards the push-button 18 and adapted so as to bear against a corresponding catch stop 30 formed on the inner wall of the end of the gripping zone 27. The tongue 31 is stopped by the stop 30 in the rest position of the push rod 29. The latter is furthermore provided at its head 32 with a finger 33 arranged so as to interact with the end of the arm 4a of the pawl 4, and with a bearing peg 34 of the arm 7b of the spring 7. The zone 28 for fastening to the cassette 5 is provided with internal ribs 8a interacting with the complementary flanks 9 of the cassette 5. These ribs 8a are longer than the ribs 8 of the brake in FIG. 1 owing to the fact that the length of the zone 28 is greater than that of the zone 6a.

When actuating the brake and when the user presses on the push-button 18, the rod 29 is subjected to slight flexion, permitted by its semi-rigidity and by the width of the hollow zone 28. Nevertheless, it is capable of transmitting to the pawl 4 a force which is sufficient to unlock the brake and, consequently, the functioning of the brake is substantially identical to that in FIGS. 1 to 4.

The invention may have numerous alternative embodiments.

I claim:

1. Hand brake for a motor vehicle, designed so as to be connected to a brake cable (15), comprising a ratchet plate (1, 2) intended to be fixed to the floor of the vehicle, a pawl (4) designed so as to interact with the ratchet plate, and a handgrip lever (6; 26) equipped with a push-button (18) associated with the pawl, characterised in that it comprises a cassette casing (5 mechanically integral with the grip lever, containing the ratchet plate (1, 2) and the pawl (4), and this cassette casing is articulated about a transverse pivot pin (13) traversing the ratchet plate and is adapted so as to receive the end of the cable (15);

the cassette casing (5) is formed from two end pieces (5a) rigidly interconnected by the abovementioned transverse pivot pin (13), between which are arranged the ratchet plate (1) and the pawl (4) and which are provided with means (8, 11, 12) for fastening to the lever (6; 26);

the cassette casing (5) is housed in an end part (6b; 28) of the lever (6; 26), integrally connected to the cassette casing, which is provided with internal ribs (8; 8a) over which hook complementary retaining flanks (9) of the cassette casing, the said means for fastening the cassette casing to the lever also comprising, at least one rivet (12);

the grip lever (6; 26), contains a semi-rigid push rod (17; 29) capable of sliding inside the lever (6; 26) and whose head (19; 32) can push the pawl (4) in order to release it from the ratchet plate (2) and to enable the lever and the cassette casing (5) to pivot about their common axis of rotation (13);

the lever (26) is angled and the push rod (29) is curved so as to match the angle of the lever;

the grip lever (6; 26) is made from moulded plastic and has two hollow zones (6a, 6b; 27, 28) respectively in the handgrip zone and in the zone for fastening to the cassette casing (5), these hollow zones being obtained by means of two movable cores of the mould having opposite and non-parallel axes of displacement (N1, N2); and a return spring (7) housed in the cassette casing (5) and a first end (7a) of which interacts with the pawl (4) in order to return it into its position bearing on the ratchet plate (1, 2), and the second end (7b) interacts with the push rod (17, 29) in order to return it into its initial rest position, which corresponds to the bearing position of the pawl on the ratchet plate.

2. Brake according to claim 1, characterised in that the push rod (17; 29) is provided with a projecting element (24; 31) capable of interacting with an internal stop (25; 30) of the lever (6; 26) under the push of the return spring (7) in order to retain the lever in its rest position corresponding to the bearing of the pawl (4) on the ratchet plate (1, 2).

* * * * *